J. Pitts.
Cloth Shearing Mach.
N° 2,822.   Patented Oct. 17, 1842.
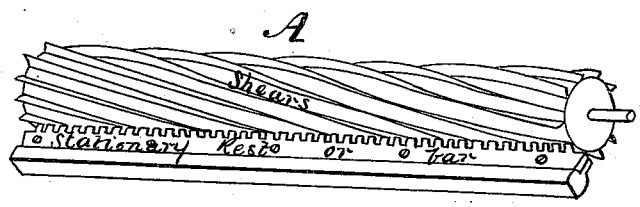
Witnesses
Abel Wieder
Fred. M. Ballou
Inventor
James Pitts

UNITED STATES PATENT OFFICE.

JAMES PITTS, OF SMITHFIELD, RHODE ISLAND.

MODE OF SHEARING SATINETS AND OTHER WOOLEN CLOTHS.

Specification of Letters Patent No. 2,822, dated October 17, 1842.

*To all whom it may concern:*

Be it known that I, JAMES PITTS, of Smithfield, in the county of Providence and State of Rhode Island, have invented a new and useful Improvement in Modes of Shearing Satinets and other Woolen Cloths, of which the following is an exact and full description.

Construct a shearing machine like those which are now in ordinary use except the bar or rest, over which the cloth passes when the shears are applied to it. In ordinary shearing machines the upper edge of this bar or rest, is flat and stationary, and the surface thereof, if round and revolving is straight and even; and the cloth in passing over it, becomes smooth and even. Instead of the notch or groove the upper edge of the flat and stationary bar, or if round and revolving, notch or groove the surface thereof; by which means the cloth in passing over it will assume the appearance of being ribbed and can hardly be distinguished from ribbed cassimere. The bar or rest, both flat and round, may be so notched or grooved as to produce on the cloth as if passed over the diamond figure, or any other figure, at the fancy or taste of the designer. Before the cloth is passed over the improved rest or bar, as above described, it should be passed over a rest or bar like those in ordinary use.

This improvement, in the upper edge or surface of the rest or bar, may be applied to any other shearing machine for shearing satinets and woolen cloths, as well as to the shearing machine now in use, and with the same benefit.

What I claim, as my invention, and desire to secure by Letters Patent is—

The employment of a rest or bar, such as herein described, in combination with the shear of a cloth shearing machine; whether the shear be rotary, vibratory, or operating in any other manner, all as described.

A drawing of the shears now in ordinary use, with a stationary rest or bar, notched or grooved as above described is hereunto annexed, marked A, and also a drawing of the shears now in ordinary use with a revolving bar or rest, notched or grooved so as to produce the diamond figure on the cloth is hereunto annexed marked B, and both said drawings are hereby made a part of the specification.

In testimony whereof I the said JAMES PITTS hereto subscribe my name in the presence of the witnesses whose names are hereunto subscribed on the sixth day of September A. D., eighteen hundred and forty-two.

JAMES PITTS.

In presence of—
  ABEL WILDER,
  FRED M. BATTON.